May 11, 1926.
A. LENTATY
CLUTCH
1,584,104
Filed March 25, 1924
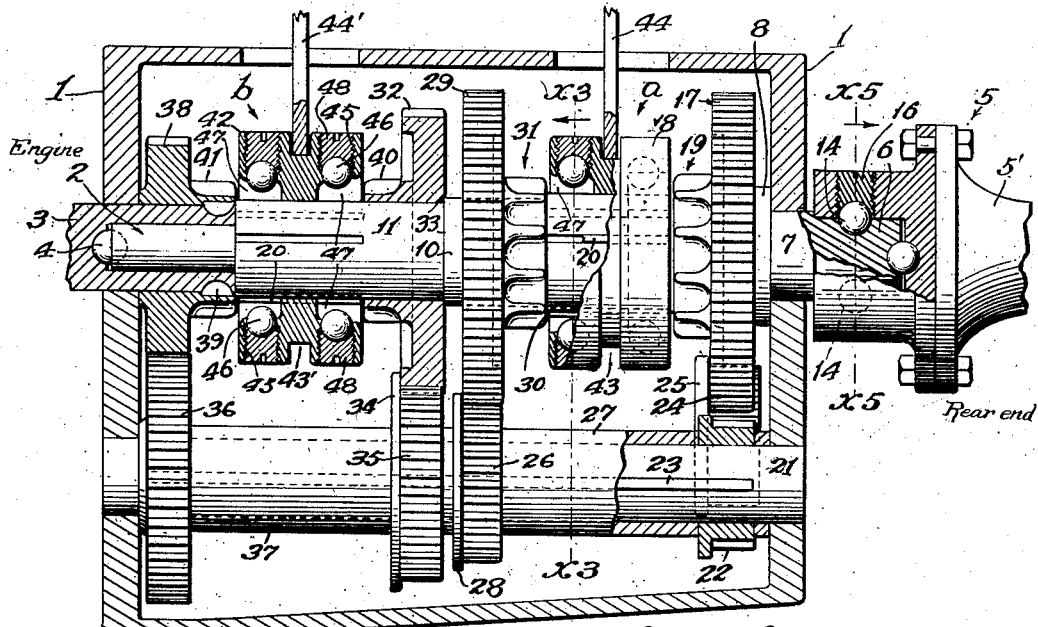
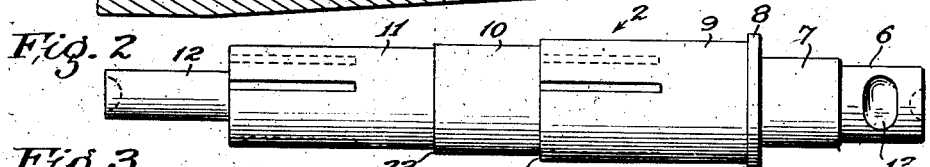
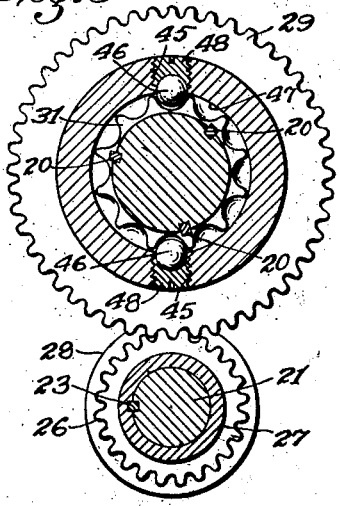
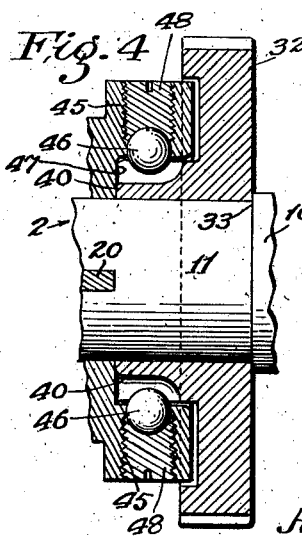
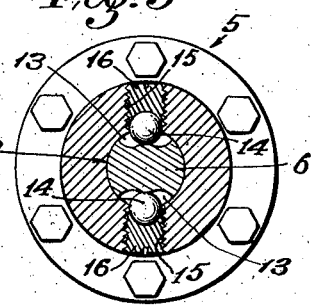
Witness
C. C. Holly
Inventor
Ambrose Lentaty
by
James R. Townsend
his Atty Patented May 11, 1926.

1,584,104

UNITED STATES PATENT OFFICE.

AMBROSE LENTATY, OF LOS ANGELES, CALIFORNIA.

CLUTCH.

Application filed March 25, 1924. Serial No. 701,644.

An object of this invention is to provide a clutch that can be easily and relatively noislessly engaged while one or both of the clutching members are in action; and so that such engagement of the moving clutch members can be effected without danger of injuring the clutch.

Another object is to provide a change speed clutch for a transmission that can be engaged while in action without undue noise or danger of stripping the gears of the transmission. To that end I provide a clutch in which the shifted member is provided with rotatable members in the form of clutch balls that are adapted to be moved into clutching engagement with the other member of the clutch that is provided with hypocyloid gear teeth integral with a side of a speed gear of the transmission; and the teeth are so constructed and arranged that the clutch balls can be engaged with them without undue noise or shock.

Features of invention are shown in the construction, combination and arrangement of the parts whereby a simple and effective clutch is provided that is relatively noiseless.

Other objects, advantages and features of invention may appear from the accompanying drawing, the subjoined detailed description and the appended claims.

The accompanying drawing illustrates the invention.

Figure 1 is a central longitudinal section through a transmission showing clutches in connection therewith that are constructed in accordance with this invention; and shown in idle position.

Fig. 2 is a plan view of the transmission clutch driver-shaft; detached from the casing.

Fig. 3 is a cross section on line $x^3$—$x^3$, Fig. 1 showing the clutch in engaging position.

Fig. 4 is an enlarged longitudinal fragmental sectional view of a clutch in clutching position.

Fig. 5 is a cross section on line $x^5$—$x^5$, Fig. 1 showing a clutch member utilized in connection with a shaft coupling as a shaft key.

The clutch can be formed either single or double acting.

As shown in the drawing I provide a transmission having two double acting clutches —a— and —b— connected therewith.

The transmission comprises a housing 1 in which the driven and driver shafts 2, 3 are mounted end to end; and preferably one end of the driver shaft is journaled into an end of shaft 3, and seated in the end recess of shaft 3 is an end thrust ball 4 that is adapted to engage the journaled end of shaft 2.

The other end of the shaft 2 is connected by a coupling 5 to a differential drive shaft 5' fragmentally shown and which is well understood in the art.

Shaft 2 is preferably constructed as best shown in Fig. 2; and as seen therein it comprises the integral sections 6, 7, 8, 9, 10, 11 and 12 that vary in diameter and length and that are constructed for the following purposes.

Section 6 has oppositely arranged recesses 13 into which are extended the ball keys 14 that are seated in and secured in threaded recesses 15 in the coupling 5 by screw plugs 16 as shown in Figs. 1 and 5. The recesses 13 and balls 14 are spaced equidistant around the axis of the hub; and when only two balls 14 are used they are arranged oppositely to one another. It is understood that I may use any number of balls as two, three four or more.

Section 7 forms a bearing for the shaft 2 and the annular ring section 8 is arranged adjacent the wall of the housing 1 and forms an abutment against which a side of the loosely mounted gear 17 contacts and limits the movement of the gear toward the end 6 of the shaft 2 when the hub member 18 of clutch —a— is moved to engage the clutch member 19 that is integral with a side of the gear 17.

Clutch hub member 18 is slidably mounted on the section 9 and arranged on the keys 20 so that it constantly rotates when the shaft is driven.

A counter shaft 21 is journaled in the housing 1; and a gear 22 is secured to this shaft by a key 23, and through an idle gear 24 the gear 22 is in driving engagement with the gear 17.

Gear 24 carries an integral annular ring 25 that engages the clutch side of the gear 17 and prevents it from longitudinal movement on the shaft 2 toward the end 12.

Also mounted on and secured to the shaft 21 is a gear 26 that has an elongated hub 27; and this gear carries an annular ring 28 that engages a side of the clutch gear 29 that is loosely mounted on the section 10 of the shaft 2; and it is held from longitudinal movement relative to the shaft 2 by the coacting annular ring 28 and a shoulder 30 on the shaft 2.

The gear 29 carries a clutch member 31 that also is adapted to be engaged by the member 18 when it is actuated toward gear 29.

Another gear 32 is loosely mounted on section 11 of shaft 2; and it is prevented from longitudinal movement relative to the shaft by a shoulder 33 on the shaft 2 and by an annular ring 34 on a gear 35 that is secured to the shaft 21 by the key 23.

Gear 35 is integrally connected to a gear 36 by a sleeve 37; and the parts 22, 26, 27, 35, 36, and 37 are constructed and arranged so that they snugly fill the spaces between the end walls of the housing; and so that the annular rings 25, 28 and 34 can function to aid in holding the gears 17, 29 and 32 from longitudinal movement relative to the shaft 2 when their clutch members are engaged by the shifting clutch members.

Meshing with the gear 36 is a low speed gear 38 that is secured to the driver shaft 3 by a key 39, and which gear 38 carries the high speed clutch member 41.

The gears 32 and 38 carry the clutch members 40 and 41 that are adapted to be engaged by the member 42 of the clutch —b—.

As previously stated the clutches —a— and —b— are constructed substantially alike; the members 18 and 42 are provided with annular recesses 43, 43′ into which are fitted the forked ends of the shifting levers 44, 44′ the construction and operation of which are well known in the art.

The members 18 and 42 are provided with rotatable members in the form of clutch balls 46 that are seated in the clutch members so that portions of the rotatable members extend out into the recesses 47 which are formed in opposite ends of the members 18 and 42, and are adapted to receive and override the clutch members 19, 31, 40 and 41. The balls 46 are secured by means of screw plugs 48 threaded into radially arranged threaded recesses 45 that extend from the periphery of the hub members into the recesses 47 and have a contracted mouth that forms a seat for the balls 46.

The end recesses 47 are formed so that the members 18 and 42 can be shifted over the clutch members 19, 31, 40, 41 so that the clutch balls 46 can engage the clutching teeth of said members.

Preferably the members 19, 31, 40 and 41 are integral with their respective gears 17, 29, 32 and 38 and they comprise external hypocycloid teeth having a tooth pitch slightly greater in extent than the diameter of the rotatable members or clutch balls 46; and also the tooth edges are rounded so that the balls 46 can be easily and noiselessly moved into or out of engagement with the teeth while the shaft 2 is in action.

In operation the clutch hub members 18 and 42 are actuated to engage their clutch balls 46 with one or the other of their respective clutching members. That is when the balls of clutch hub member 18 are engaged with the clutch teeth of clutch member 19 the gear 17 will be actuated to reverse the movement of the driven shaft 2 by means of the intervening counter shaft and gearing. And when the balls of the member 18 are engaged with the clutch teeth of the clutch member 31 the shaft 2 will be driven at low speed; it being understood of course that when the clutch member 18 is moved into clutching engagement with either the member 19 or 31 that the clutch member 42 is idle and vice versa.

When clutch hub member 42 is moved to engage the clutch member 40 the shaft 2 will be driven at an intermediate speed; and when engaging the member 41 the shaft 2 will be driven at high speed.

While I have shown this clutch as adapted for use in a transmission it is understood that I may employ it in other ways well known in the art.

I claim:

1. The clutch set forth comprising a hub member adapted to be mounted on and rotated by a shaft, said hub member having threaded recesses therein; clutch balls seated in said recesses, said balls arranged to extend partly out of said recesses toward the axis of said hub member; another clutch member; and means for engaging and disengaging said balls with said other clutch member.

2. The clutch set forth comprising a hub member adapted to be mounted on and rotated by a shaft and having recessed ends, also radially arranged recesses extending from the periphery of said hub member into the recesses in the ends of said hub member; ball seats in the radial recesses; clutch balls in said ball seats, said balls arranged to have portions thereof extend out into the end recesses of said hub member; other clutch members with which said hub member is adapted to cooperate; teeth on said other clutch members respectively adapted to be received in the recesses in the ends of the hub member; and means for engaging said balls and teeth.

3. The clutch set forth comprising a hub member adapted to be mounted on and rotated by a shaft and having a recessed end, also radially arranged recesses extending from the periphery of said hub member into the recess in the end thereof; ball seats in the radial recesses; clutch balls in said ball seats, said balls arranged to have portions thereof extend out into the end recess of said hub member; another clutch member; hypocycloid teeth integral with said other clutch member, said teeth having a tooth pitch slightly greater in extent than the diameter of said balls; and means for engaging and disengaging said balls and teeth.

4. The clutch set forth comprising a hub member adapted to be mounted on and rotated by a shaft and having recessed ends and also threaded radial recesses oppositely arranged and extending from the periphery of said hub member into the end recesses thereof: ball seats in the radial recesses; clutch balls in said seats, said balls arranged to have portions thereof extend out into the end recesses of said hub member; screw plugs threaded into said threaded recesses for holding said balls in said seats; other clutch members; teeth on said other clutch members; and means for engaging and disengaging the balls extending into one of said end recesses with the teeth of one of said other clutch members, and for engaging and disengaging the balls extending into the other of said end recesses with the teeth of the other clutch member.

5. The clutch for a transmission set forth comprising a hub member having end and radial recesses therein; clutch balls in the radial recesses of said hub, said balls arranged to have portions thereof extend out of the radial into the end recess of said hub member; a driven shaft on which said hub member is slidably mounted and with which it is adapted to rotate; a driver shaft arranged end to end with said driven shaft; another clutch member secured to said driver shaft; external teeth on said other clutch member adapted to be received in the end recess of said hub member; and means for moving said hub member for engaging and disengaging said balls and teeth.

6. The clutch for a transmission set forth comprising a hub member having end and radial recesses; ball seats in the radial recesses; clutch balls in said seats, said balls arranged so that portions thereof extend out of the radial into the end recess of said hub member; screw plugs for securing said balls in said radial recesses; a driven shaft on which said hub member is slidably mounted and with which it is adapted to rotate; a driver shaft arranged end to end with said driven shaft; another clutch member secured to said driver shaft; hypocycloid teeth integral with said other member and adapted to be received in the end recess of said hub member; and means for engaging and disengaging said balls and teeth.

7. A clutch of the character described comprising a clutch hub member having an end recess and other recesses, said other recesses having a contracted mouth to form a seat; a clutch member having teeth adapted to be received in said end recess; rotatable members seated in said other recesses and adapted to extend into the end recess; means to retain said rotatable members in said other recesses; and means to move said rotatable members into and out of engagement with said teeth.

8. A clutch of the character described comprising a clutch hub member having an end recess and other recesses; rotatable members seated in said other recesses and adapted to extend into the end recess; means to retain said rotatable members in said other recesses; a clutch member having external teeth adapted to be received in said end recess; and means to move said rotatable members into and out of engagement with said teeth.

In testimony whereof, I have hereunto set my hand at Los Angeles, California, this 19th day of March, 1924.

AMBROSE LENTATY.